US010539468B2

(12) United States Patent
Mizoguchi

(10) Patent No.: US 10,539,468 B2
(45) Date of Patent: Jan. 21, 2020

(54) ABNORMALITY DETECTION APPARATUS, ABNORMALITY DETECTION METHOD, AND NON-TRANSITORY COMPUTER-READABLE MEDIUM

(71) Applicant: NEC CORPORATION, Tokyo (JP)

(72) Inventor: Takehiko Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 15/553,435

(22) PCT Filed: Feb. 17, 2016

(86) PCT No.: PCT/JP2016/000827
§ 371 (c)(1),
(2) Date: Aug. 24, 2017

(87) PCT Pub. No.: WO2016/136198
PCT Pub. Date: Sep. 1, 2016

(65) Prior Publication Data
US 2018/0245987 A1 Aug. 30, 2018

(30) Foreign Application Priority Data
Feb. 25, 2015 (JP) .................................. 2015-034631

(51) Int. Cl.
G06F 17/18 (2006.01)
G01K 3/10 (2006.01)
G06F 17/15 (2006.01)

(52) U.S. Cl.
CPC ............... *G01K 3/10* (2013.01); *G06F 17/15* (2013.01)

(58) Field of Classification Search
CPC .. G01K 3/10; G06K 9/00496; G05B 23/0224; G06F 17/15; G06F 17/18
See application file for complete search history.

(56) References Cited

U.S. PATENT DOCUMENTS 7,975,186 B2 7/2011 Kato
8,190,949 B2 5/2012 Kato
(Continued)

FOREIGN PATENT DOCUMENTS

JP 2006-135412 5/2006
JP 2009-199533 9/2009
(Continued)

OTHER PUBLICATIONS

Liu et al., Modeling Heterogeneous Time Series Dynamics to Profile Big Sensor Data in Complex Physical Systems, 2013 IEEE International Conference on Big Data, pp. 631-638 (Year: 2013).*
(Continued)

*Primary Examiner* — Toan M Le
(74) *Attorney, Agent, or Firm* — Young & Thompson

(57) ABSTRACT

A system monitoring apparatus has: a determination unit for determining whether the relatedness indicating a relationship that is true for first time-series data of multiple sets measured during a first time period is true for second time-series data of the multiple sets measured during a second time period; an irregularity degree calculation unit for calculating the degree of irregularity indicating the extent to which the second time-series data is irregular; a first extent calculation unit for calculating a first extent indicating the extent to which the irregularity is at a specified value when the second time-series data are normal or irregular; a second extent calculation unit for calculating a second extent indicating the extent to which the second time-series data of the multiple sets are related; and a state calculation unit for finding whether the second time-series data are normal or irregular, based on the first and second extents.

15 Claims, 14 Drawing Sheets

(56) References Cited

U.S. PATENT DOCUMENTS

| | | |
|---|---|---|
| 8,286,035 B2 | 10/2012 | Kato |
| 8,645,769 B2 | 2/2014 | Hasegawa |
| 2009/0217099 A1 | 8/2009 | Kato |
| 2012/0278663 A1 | 11/2012 | Hasegawa |

FOREIGN PATENT DOCUMENTS

| | | |
|---|---|---|
| JP | 2009-211472 | 9/2009 |
| JP | 5267684 | 8/2013 |
| JP | 2013-210945 | 10/2013 |
| WO | WO 2011/083687 | 7/2011 |

OTHER PUBLICATIONS

Axell et al., A Bayesian Approach to Spectrum Sensing, Denoising and Anomaly Detection, 2009 IEEE, ICASSP 2009, pp. 2333-2336 (Year: 2009).*
International Search Report dated Apr. 26, 2016 in International Application No. PCT/JP2016/000827.

* cited by examiner

Fig. 1

| DATE | TIME | STATE | LOWER PORTION TEMPERATURE (°C) | UPPER PORTION TEMPERATURE (°C) | ROOM TEMPERATURE (°C) | HUMIDITY (%) | ... |
|---|---|---|---|---|---|---|---|
| 2014/2/6 | 0:00 | NORMAL | 23 | 28 | 22 | 40 | ... |
| 2014/2/6 | 6:00 | NORMAL | 25 | 30 | 23 | 45 | ... |
| 2014/2/6 | 12:00 | NORMAL | 30 | 35 | 25 | 41 | ... |
| 2014/2/6 | 18:00 | NORMAL | 22 | 29 | 24 | 50 | ... |
| 2014/2/7 | 0:00 | NORMAL | 24 | 29 | 22 | 48 | ... |
| 2014/2/7 | 6:00 | NORMAL | 28 | 35 | 23 | 46 | ... |
| 2014/2/7 | 12:00 | ABNORMAL | 29 | 38 | 25 | 41 | ... |
| 2014/2/7 | 18:00 | ABNORMAL | 24 | 35 | 24 | 43 | ... |
| 2014/2/8 | 0:00 | ABNORMAL | 23 | 29 | 28 | 46 | ... |
| 2014/2/8 | 6:00 | NORMAL | 25 | 30 | 23 | 47 | ... |
| 2014/2/8 | 12:00 | NORMAL | 30 | 35 | 25 | 44 | ... |
| 2014/2/8 | 18:00 | NORMAL | 22 | 29 | 24 | 41 | ... |

Fig. 3

| TIME-SERIES ID | MEASUREMENT ITEM | STATE | TIME-SERIES DATA |
|---|---|---|---|
| 1 | TEMPERATURE | NORMAL | 40, 45, 41, ... |
| 2 | HUMIDITY | ABNORMAL | 41, 43, 46, ... |
| 3 | UPPER PORTION TEMPERATURE | NORMAL | 28, 30, 35, ... |
| ... | ... | ... | ... |

Fig. 4

| RELEVANCE MODEL ID | RELEVANCE MODEL |
|---|---|
| 1 | (TIME-SERIES DATA 1)=(TIME-SERIES DATA 6) × 3+1 |
| 2 | (TIME-SERIES DATA 2)=(TIME-SERIES DATA 5) × 6−5 |
| 3 | (TIME-SERIES DATA 4)=(TIME-SERIES DATA 8) × 0.3−3.5 |
| ... | ... |

Fig. 11

| VERTEX ID | IRREGULARITY DEGREE |
|---|---|
| 1 | 0.333333 |
| 2 | 0.5 |
| 3 | 0.5 |
| 4 | 0.16667 |
| 5 | 0.5 |
| 6 | 0.5 |
| 7 | 0.833333 |
| 8 | 1 |
| 9 | 1 |

Fig. 12

| VERTEX ID | STATE |
|---|---|
| 1 | NORMAL |
| 2 | NORMAL |
| 3 | NORMAL |
| 4 | NORMAL |
| 5 | NORMAL |
| 6 | NORMAL |
| 7 | ABNORMAL |
| 8 | ABNORMAL |
| 9 | ABNORMAL |

ABNORMALITY DETECTION APPARATUS, ABNORMALITY DETECTION METHOD, AND NON-TRANSITORY COMPUTER-READABLE MEDIUM

TECHNICAL FIELD

The present invention relates to a system monitoring apparatus and the like capable of specifying a defect concerning the monitoring target and the like.

BACKGROUND ART

For a large-scale and complicated physical system such as a nuclear plant or a chemical plant, state values (measured values, performance values) for the physical system and the like are measured using sensors (detection ends) such as thermometers. The measured state value is stored as performance information, for example, by being associated with the time when it was measured for each sensor used for measurement. From the performance information, time-series data (time-series information, time series record) about the performance information is made by extracting measurement values during a certain period.

When a physical system, i.e., a monitoring target, is monitored, for example, relevance between a plurality of measurement values included in the performance information is analyzed with, for example, an analysis method such as correlation analysis. The correlation analysis is also used as a method for detecting abnormality of a large-scale information system including a large number of servers and communication network equipment.

An operation management apparatus disclosed in the PTL 1 reads, as time-series data, measurement values during the period of time in which the physical system is operating normally from two different pieces of performance information (hereinafter referred to as "first performance information", "second performance information"). The operation management apparatus generates a correlation model by deriving a mathematical relational expression between two pieces of read time-series data. For example, the operation management apparatus reads, as first time-series data, measurement values in the monitoring period of time in which the physical system is measured from the first performance information, and reads, as second time-series data, measurement values in the monitoring period of time from the second performance information.

The operation management apparatus estimates second time-series data by applying the generated correlation model to first time-series data. The operation management apparatus compares the read second time-series data with the estimated second time-series data, and determines whether the generated correlation model is also satisfied for the time-series data in the monitoring period of time based on the comparison result. In other word, the operation management apparatus determines whether or not the generated correlation model is also maintained with regard to the time-series data on the monitoring period of time.

The operation management apparatus disclosed in the PTL 2 measures measurement values on multiple performance indexes for the apparatuses serving as the monitoring targets, and determines whether or not the measured measurement values are abnormal. When the measurement values are determined to be abnormal, the operation management apparatus selects the performance indexes on the measurement values as abnormal items. The operation management apparatus excludes, from each abnormal item, abnormal items specified for each apparatus which is the monitoring target. As a result, the operation management apparatus can specify the factor of abnormality in a shorter period of time, when a plurality of servers detect abnormality.

The operation management apparatus disclosed in PTL 3 has a model generation unit, which derives the change of time-series data for a plurality of performance information measured by a plurality of managed apparatuses such as sensors, and calculates a correlation model representing the correlation between changes relating to the plurality of pieces of derived time-series data. The operation management apparatus further includes an analysis unit, which calculate time-series data about the performance information newly detected, and determines whether or not the calculated correlation model is satisfied or not, on the basis of the calculated time-series data. Therefore, the operation management apparatus can detect (determine) a failure based on whether or not the correlation model is satisfied.

The remote monitoring system disclosed in PTL 4 has a model construction unit, which a first correlation satisfied between a plurality of measurement values measured for a monitoring target within a period of time in which the monitoring target is normally operating, and a second correlation that is satisfied between some of the measurement values. The remote monitoring system further includes a detection unit which applies each of the first correlation and the second correlation to the measurement values measured within a monitoring period of time for the monitoring target, and detects as to whether the monitoring target malfunctions or not on the basis of the calculated result.

CITATION LIST

Patent Literature

PTL 1: Japanese Unexamined Patent Application Publication No. 2009-199533
PTL 2: International Publication No. WO 2011/083687
PTL 3: Japanese Unexamined Patent Application Publication No. 2009-211472
PTL 4: Japanese Unexamined Patent Application Publication No. 2006-135412

SUMMARY OF INVENTION

Technical Problem

Although the apparatuses disclosed in PTL 1 to PTL 4 calculates the correlation between at least two pieces of time-series data, it is not possible for the apparatuses disclosed in PTL 1 to PTL 4 to identify which time-series data is a factor of the failure of the monitoring target.

Therefore, it is a main purpose of the present invention to provide a system monitoring apparatus and the like that can identify a factor of the failure related to the monitoring target.

Solution to Problem

In order to achieve the aforementioned object, as an aspect of the present invention, a system monitoring including:

determination means for determining whether a relevance representing a relationship on a plurality of sets of first time-series data measured in a first time period with regard to a monitoring target is satisfied for a plurality of second time-series data measured in a second period of time;

irregularity degree calculation means for calculating an irregularity degree representing a degree that the second time-series data is abnormal on basis of the relevance determined to be satisfied by the determination means and the relevance determined not to be satisfied by the determination means;

first degree calculation means for calculating a first degree representing a degree that the irregularity degree is a particular value in a case where the second time-series data is normal or abnormal on basis of the irregularity degree calculated with regard to the second time-series data;

second degree calculation means for calculating a second degree representing a degree that the plurality of sets of second time-series data are related, on basis of the relevance with regard to the first period of time; and state calculation means for deriving whether the second time-series data is normal or abnormal on basis of the first degree and the second degree.

In addition, as another aspect of the present invention, a system monitoring method including:

determining whether a relevance representing a relationship on a plurality of sets of first time-series data measured in a first time period with regard to a monitoring target is satisfied for a plurality of second time-series data measured in a second period of time;

calculating an irregularity degree representing a degree that the second time-series data is abnormal on basis of the relevance determined to be satisfied and the relevance determined not to be satisfied;

calculating a first degree representing a degree that the irregularity degree is a particular value in a case where the second time-series data is normal or abnormal on basis of the irregularity degree calculated with regard to the second time-series data;

calculating a second degree representing a degree that the plurality of sets of second time-series data are related, on basis of the relevance with regard to the first period of time; and deriving whether the second time-series data is normal or abnormal on basis of the first degree and the second degree.

In addition, as another aspect of the present invention, a system monitoring program making a computer achieve including:

a determination function for determining whether a relevance representing a relationship on a plurality of sets of first time-series data measured in a first time period with regard to a monitoring target is satisfied for a plurality of second time-series data measured in a second period of time;

an irregularity degree calculation function for calculating an irregularity degree representing a degree that the second time-series data is abnormal on basis of the relevance determined to be satisfied by the determination function and the relevance determined not to be satisfied by the determination function;

a first degree calculation function for calculating a first degree representing a degree that the irregularity degree is a particular value in a case where the second time-series data is normal or abnormal on basis of the irregularity degree calculated with regard to the second time-series data;

a second degree calculation function for calculating a second degree representing a degree that the plurality of sets of second time-series data are related, on basis of the relevance with regard to the first period of time; and a state calculation function for deriving whether the second time-series data is normal or abnormal on basis of the first degree and the second degree.

Furthermore, the object is also realized by an associated system monitoring program, and a computer-readable recording medium which records the program.

Advantageous Effects of Invention

According to the system monitoring apparatus and the like according to the present invention, a factor of the failure related to the monitoring target can be identified.

BRIEF DESCRIPTION OF DRAWINGS

FIG. 1 is a diagram conceptually illustrating an example of measurement information referred to by a system monitoring apparatus according to each example embodiment of the present invention.

FIG. 3 is a diagram conceptually illustrating an example of time-series information referred to by a system monitoring apparatus according to each example embodiment of the present invention.

FIG. 4 is a diagram conceptually illustrating an example of relevance model information referred to by a system monitoring apparatus according to each example embodiment of the present invention.

FIG. 11 is a diagram conceptually illustrating an example of irregularity degree information.

FIG. 12 is a diagram conceptually illustrating determination information calculated by an abnormality determination unit.

DESCRIPTION OF EMBODIMENTS

Figure 2:
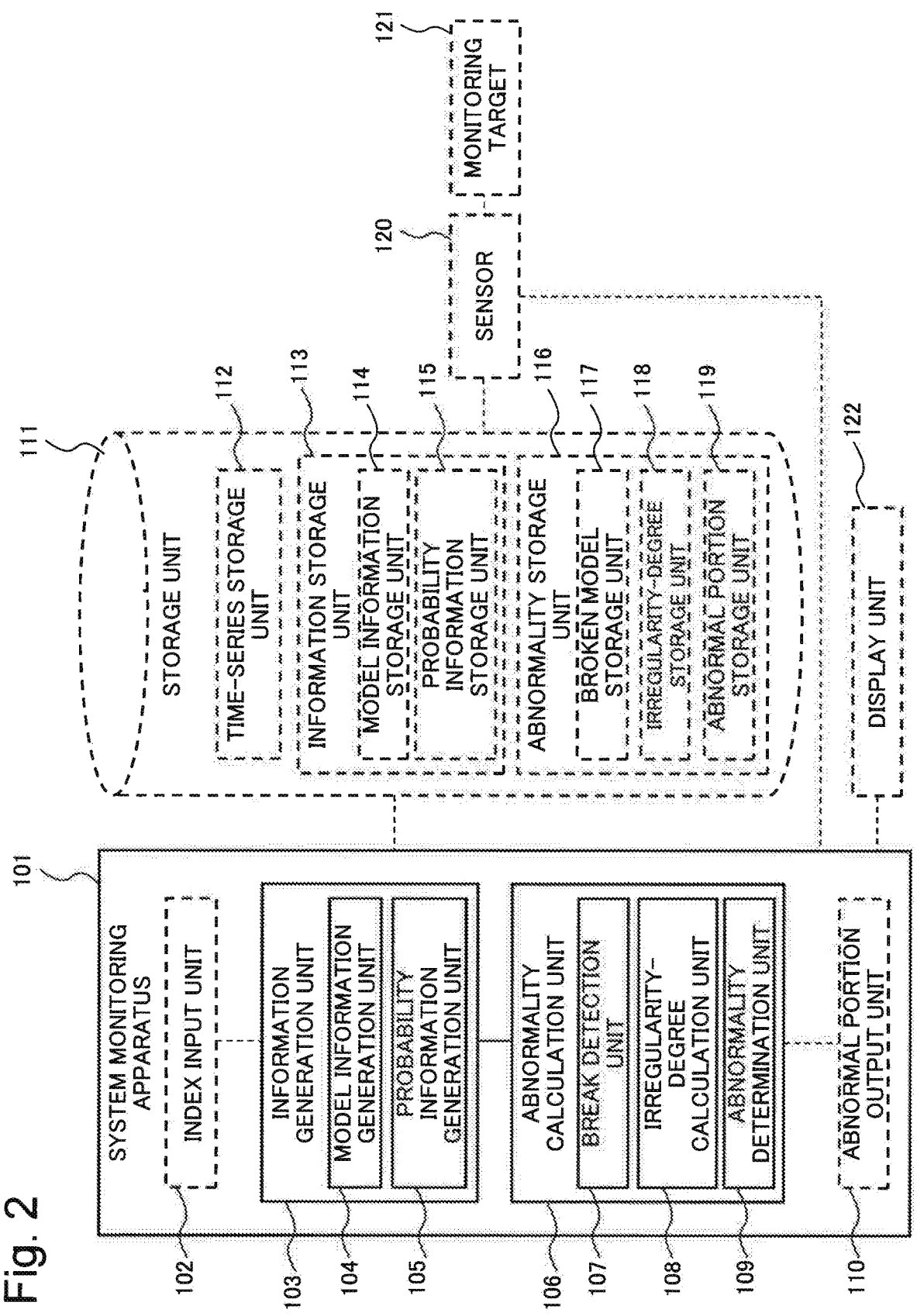
FIG. 2 is a block diagram illustrating a configuration of a system monitoring apparatus according to a first example embodiment of the present invention.

First, the terms used in the specification of the present application are defined with reference to FIG. 1. FIG. 1 is a diagram conceptually illustrating an example of measurement information referred to by a system monitoring apparatus according to each example embodiment of the present invention.

With regard to the monitoring target (analyzed apparatus, analyzed system, information system, physical system) representing the object to be monitored, for example, sensors measuring the monitoring target measures values (measurement values) on indexes (measurement items, performance indexes) such as a temperature, a room temperature, and a humidity. For example, the measured values are transmitted to the system monitoring apparatus, and are stored as measurement information as illustrated in FIG. 1. FIG. 1 is a diagram conceptually illustrating an example of measurement information referred to by the system monitoring apparatus according to each example embodiment of the present invention.

With the measurement information illustrated as an example in FIG. 1, for example, a measurement value on a measurement item (upper portion temperature, room temperature, humidity, and the like) measured by sensors, a date and time at which the measurement value is measured, and a state of the monitoring target at a point in time when the measurement value is measured (normal or abnormal) are associated with each other. In FIG. 1, the unit of lower portion temperature, the upper portion temperature, and the room temperature is in Celsius (degrees Celsius). The unit of humidity is "%". In the following description, descriptions of units are omitted. In the measurement information illustrated in FIG. 1, date "Feb. 6, 2014", time "0:00", state "normal", lower portion temperature "23", and upper portion temperature "28" are associated with each other. This indicates that, at the time "0:00" of the date "Feb. 6, 2014", the upper portion temperature measured by the sensor is 28 degrees Celsius, the lower portion temperature measured by the sensor is 23 degrees Celsius, and the monitoring target is normal.

Each measurement value in chronological order is extracted for a particular period of time on the basis of the measurement information, so that the time-series data (time-series data set, time-series information, time series record) on the measurement value is selected. For example, the lower portion temperature on date "Feb. 6, 2014" is extracted, so that "23, 25, 30, 22" are selected as the time-series data on the lower portion temperature.

Hereinafter, the time-series data set is also simply referred to as "time-series data".

For example, the humidity in the period of time associated with the state "abnormal" (from 12:00 on Feb. 7, 2014 to 0:00 on Feb. 8, 2014) is extracted, so that "46, 41, 43, 46" are selected as time-series data on the humidity. In other word, the specified time-series data represents the measurement value on the room temperature in the period of time (abnormal period of time) where the monitoring target is abnormal.

For example, the room temperature in the period of time associated with state "normal" (from 0:00 on Feb. 6, 2014 to 6:00 on Feb. 7, 2014) is extracted, so that the time-series data "22, 23, 25, 24, 22, 23" on the room temperature can be selected. In other word, the time-series data represents the measurement value on the room temperature in the period of time (normal period of time) where the monitoring target is in the normal state (operating normally).

With regard to the time-series data on two measurement values (for example, the room temperature and the lower portion temperature) in the normal period of time, a relevance model represents, for example, a model (relational expression) that mathematically expresses relevance between one of the time-series data and the other of the time-series data. For example, the relevance model (relevance of different performance indexes during a certain period) includes a mathematical model such as correlation coefficient AutoRegressive_eXogeneous (ARX) model.

A break of a relevance model represents a state where, when a relevance model calculated based on time-series data during a certain period is applied to time-series data in a period of time that is different from the certain period of time, the estimated time-series data is far from the time-series data during the certain period. The determination as to whether estimated time-series data is far or not can be made on the basis of whether, for example, a difference between the estimated time-series data and the time-series data at the certain period of time (more specifically, estimation error, prediction error) is more than a predetermined threshold value (more specifically, a predetermined condition is satisfied or not). It should be noted that the break is expressed as "break", "destruction".

The time-series data may be, for example, time-series data about measurement values such as a usage rate of an operating apparatus, a usage rate of a memory, a frequency of disk access, or the like, which are included in the operation information about the information processing system to be an example of a monitoring target. The time-series data may be time-series data on measurement values such as, for example, a power consumption amount, an operation frequency, or the like. For example, the time-series data may be time-series data on a value such as a performance index measured in an operating period of the information processing system. The time-series data does not necessarily have to be a value, but may be a symbol, a sign, or the like. The time-series data is not limited to the above example.

Next, example embodiments for carrying out the present invention will be described in details with reference to the drawings.

First Example Embodiment

In the present example embodiment, a system monitoring apparatus according to the present example embodiment will be described using an example of identifying an abnormal portion (factor) in the monitoring target. In the present example embodiment, it is assumed that a plurality of measurement values (for example, temperature, humidity, and the like) regarding the monitoring target can be measured via a sensor measuring the monitoring target.

A configuration of a system monitoring apparatus 101 according to the first example embodiment of the present invention will be described with reference to FIG. 2. FIG. 2 is a block diagram illustrating the configuration of the system monitoring apparatus 101 according to the first example embodiment of the present invention.

The system monitoring apparatus 101 according to the present example embodiment has an information generation unit (model generation unit) 103 and an abnormality calculation unit 106. The system monitoring apparatus 101 may further have an index input unit 102 and an abnormal portion output unit 110. The system monitoring apparatus 101 may be connected to a storage unit 111 including a time-series storage unit 112, an information storage unit 113, and an abnormality storage unit 116.

The system monitoring apparatus 101 according to the first example embodiment can read information with regard to a monitoring target 121 from the storage unit 111 storing performance, measurement value, and the like measured by a plurality of sensors (analyzed apparatuses) 120. The system monitoring apparatus 101 according to the first example embodiment may be realized by a mode of receiving information transmitted by the sensor 120. In the following description, for convenience of explanation, it is assumed that the system monitoring apparatus 101 can receive the information transmitted by the sensor 120.

The sensor 120 measures the performance and the like relating to, for example, monitoring target 121 as measurement values with a regular time interval. The sensor 120 transmits the measurement value measured with regard to the monitoring target 121 to the system monitoring apparatus 101.

For example, the measurement value includes operation information such as the usage rate in the central processing unit (CPU), the usage rate of the memory, the frequency related to disk access, and performance information such as power consumption, number of calculations, which are measured with regard to the monitoring target 121, and the like. The measurement value is expressed with, for example, a number such as integer or a decimal value, a code such as "ON", "OFF", or a symbol such as "True" or "False".

The index input unit 102 receives the measurement value transmitted by the sensor 120 and stores the received measurement value in the storage unit 111 as measurement information as exemplified in FIG. 1. The index input unit 102 extracts the measurement value in a specific period of time (for example, the state is normal) from the measurement information (exemplified in FIG. 1) as the time-series data, and stores the extracted time-series data into the time-series storage unit 112. Furthermore, for example, the index input unit 102 extracts the measurement value in the monitoring period of time (certain period of time) from the measurement information as time-series data and stores the extracted time-series data into the time-series storage unit 112 as time-series information as exemplified in FIG. 3. FIG. 3 is a diagram conceptually illustrating an example of time-series information referred to by the system monitoring apparatus according to each example embodiment of the present invention.

Referring to time-series information exemplified in FIG. 3, a time-series Identifier (hereinafter, identifier is referred to as "ID") for identifying time-series data, the measurement item, the state of the monitoring target, the time-series data are associated with each other. For example, a time-series ID "1", a measurement item "temperature", a state "normal", and time-series data "40, 45, 41, . . . " are associated with each other. This represents that the time-series ID identifying the time-series data "40, 45, 41, . . . " is "1". Further, this indicates that the measurement item of the time-series data is the temperature and that a measurement value of the measurement item is measured in case of where the state on the monitoring target is normal.

As shown in FIG. 2, the information generation unit 103 has a model information generation unit 104 generating a relevance model or the like representing relevance for two pieces of time-series data. Further, the information generation unit 103 includes a probability information generation unit 105 generating a probabilistic model (described later with reference to FIG. 9) capable of calculating the state indicating whether the time-series data is normal or not on the basis of the generated relevance model.

The model information generation unit 104 reads from the time-series storage unit 112 the time-series data on the measurement item (sensor 120) in the period during a normal operation of the monitoring target 121. For a combination of two pieces of time-series data of the read time-series data, the model information generation unit 104 generates a relevance (for example, a correlation) on the combination as a relevance model. The model information generation unit 104 stores the generated relevance model in a model information storage unit 114 as relevance model information as exemplified in FIG. 4. FIG. 4 is a diagram conceptually illustrating an example of relevance model information referred to by the system monitoring apparatus according to each example embodiment of the present invention.

As shown in FIG. 4, in the relevance model information, a relevance model ID uniquely identifying a relevance model and the relevance model are associated with each other. For example, in the relevance model information, a relevance model ID "1" and a relevance model "(time-series data 1)=(time-series data 6)×3+1" are associated with each other. This indicates that the relevance model calculated on the basis of the time-series data represented by the time-series ID "1" and the time-series data represented by the time-series ID "6" is "(time-series data 1)=(time-series data 6)×3+1" with regard to the relevance model ID "1". The model information generation unit 104 may generate the relevance model (relevance) with regard to a combination between any given time-series data. Specific processing (for example, least squares method) for generating relevance model will be described later.

The probability information generation unit 105 reads the relevance model stored in the model information storage unit 114 and generates a probabilistic model (described below with reference to FIG. 9) that can calculate the state representing whether or not the time-series data is normal on the basis of the read relevance model. Processing in which probability information generation unit 105 generates a probabilistic model will be described later with reference to FIG. 5.

As shown in FIG. 2, the abnormality calculation unit 106 includes a break detection unit 107, an irregularity-degree calculation unit 108, and an abnormality determination unit 109.

For example, the break detection unit 107 reads the time-series data on the measurement value in the monitoring period from the time-series storage unit 112. For example, the break detection unit 107 reads from the model information storage unit 114 the relevance model (exemplified in FIG. 4) related to the time-series data. The break detection unit 107 may read the time-series data related to the read relevance model from the time-series storage unit 112.

Furthermore, the break detection unit 107 reads the probabilistic model (described later with reference to FIG. 9) generated based on the read relevance model from a probability information storage unit 115. The break detection unit 107 detects the factor (reason) of abnormality during a certain period, on the basis of the read time-series data, the read relevance model, and the read probabilistic model.

The break detection unit 107 reads the time-series data on the measurement value during a certain period from the time-series storage unit 112. The break detection unit 107 reads the relevance model (exemplified in FIG. 4) related to the read time-series data from the model information storage unit 114. The break detection unit 107 determines whether each read relevance model is satisfied with regard to the read time-series data. For example, the break detection unit 107 estimates time-series data on the measurement value at the certain period on the basis of the read relevance model, and calculates a difference (prediction error) between the estimated time-series data and the read time-series data.

In a case where a calculated prediction error exceeds a predetermined threshold value (more specifically, in a case where a prediction error does not satisfy a predetermined condition), the break detection unit 107 determines that the read relevance model is not satisfied (it is no longer maintained, it is broken). The break detection unit 107 stores the broken relevance model in a broken model storage unit 117 as a broken model. For example, the break detection unit 107 may store the relevance model ID representing the broken model in the broken model storage unit 117.

The irregularity-degree calculation unit 108 reads the broken model from the broken model storage unit 117. Subsequently, the irregularity-degree calculation unit 108 calculates an irregularity degree that is the extent to which the time-series data is related to the broken model on the basis of the read broken model. The method of calculating the irregularity degree will be described later with reference to FIG. 7.

The abnormality determination unit 109 reads the probabilistic model (described later with reference to FIG. 9) from the probability information storage unit 115. The abnormality determination unit 109 reads the broken model on the read probabilistic model from the broken model storage unit 117. Further, the abnormality determination unit 109 reads the irregularity degree of the vertex (sensor) from an irregularity-degree storage unit 118. The abnormality determination unit 109 identifies the sensor that is the factor of abnormality by estimating the state that best fits the irregularity degree. Processing procedure for identifying the sensor, which is a factor of abnormality occurrence, in the abnormality determination unit 109 will be explained later with reference to FIG. 6.

The information storage unit 113 includes the model information storage unit 114 capable of storing the relevance model generated by the model information generation unit 104 and the probability information storage unit 115 capable of storing a probabilistic model (described later with reference to FIG. 9) generated by the probability information generation unit 105.

The abnormality storage unit 116 includes a broken model storage unit 117 capable of storing a broken model generated by the break detection unit 107 and the irregularity-degree storage unit 118 capable of storing the irregularity degree calculated by the irregularity-degree calculation unit 108. Furthermore, the abnormality storage unit 116 includes an abnormal portion storage unit 119 capable of storing an abnormal portion identifying a sensor relating to time-series data representing a factor of abnormality identified by the abnormality determination unit 109.

The abnormal portion output unit 110 reads an item representing factor of abnormality from the abnormal portion storage unit 119 and outputs the read item.

Figure 5:
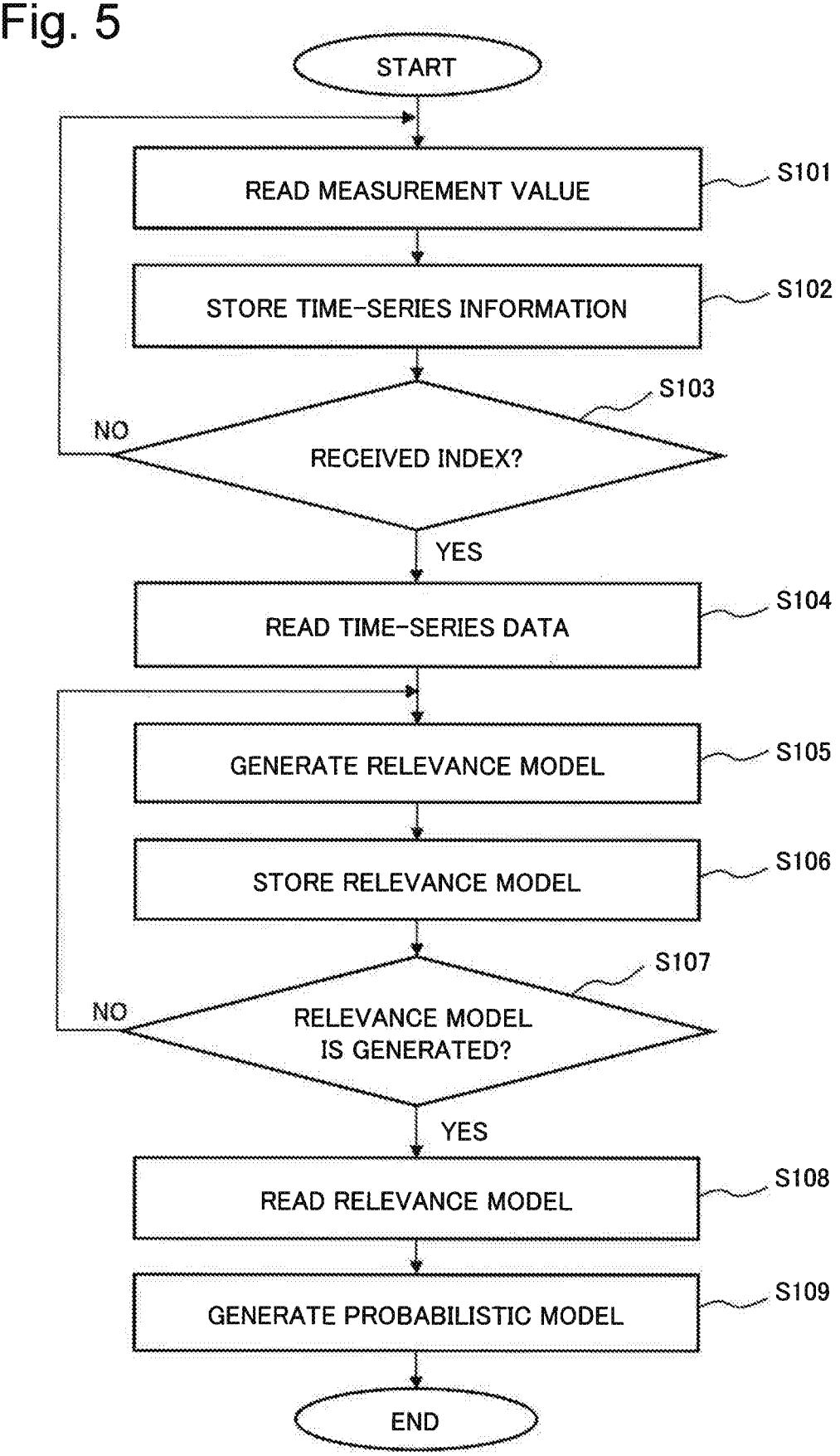
FIG. 5 is a flowchart illustrating a flow of processing of generating a probabilistic model in the system monitoring apparatus according to the first example embodiment.

Processing in the system monitoring apparatus 101 according to the first example embodiment will be described with reference to FIG. 5. FIG. 5 is a flowchart illustrating a flow of processing of generating a probabilistic model in the system monitoring apparatus 101 according to the first example embodiment.

First, the processing of generating a probabilistic model in the system monitoring apparatus 101 will be explained with reference to the flowchart shown in FIG. 5.

The index input unit 102 receives a measurement value (measurement information) transmitted by the sensor 120 (step S101). For example, the index input unit 102 generates measurement information exemplified in FIG. 1 by arranging the received measurement values in chronological order, and stores the generated measurement information in the storage unit 111. Subsequently, the index input unit 102 generates time-series information as exemplified in FIG. 3 by extracting the measurement value during a certain period as time-series data on the basis of the measurement information, and stores the generated time-series information in the time-series storage unit 112 (step S102).

For example, in a case where processing is performed to receive the measurement values from all the sensors 120, the index input unit 102 determines whether the measurement values are received from all the sensors 120 (step S103). If there is any measurement value that has not yet been received (NO in step S103), the index input unit 102 repeats the processing shown in step S101 and step S102.

When all measurement values are received (YES in step S103), the model information generation unit 104 reads a plurality of time-series data stored in the time-series storage unit 112 (step S104).

The model information generation unit 104 generates a relevance model representing the relevance between a plurality of the read time-series data (step S105). For example, when the relationship between time-series data x and time-series data y is expressed as "y=a×x+b" (where a and b represent constants), the model information generation unit 104 calculates the coefficients a and b in accordance with a procedure such as the least squares method based on the plurality of the read time-series data. The model information generation unit 104 stores the calculated relevance model in the model information storage unit 114 (step S106).

For example, when relevance models are generated with regard to combinations among all time-series data stored in the time-series storage unit 112, the model information generation unit 104 determines whether or not relevance models have been generated for all the combinations among the time-series data (step S107). When there is a combination for which a relevance model has not yet been generated (NO in step S107), the model information generation unit 104 repeats the processing shown in step S105 and step S106.

For example, when a relevance model has been generated for all the combinations of the time-series data (YES in step S107), the probability information generation unit 105 reads the relevance model from the model information storage unit 114 (step S108).

Based on the read relevance model, the probability information generation unit 105 generates a probabilistic model (described later with reference to FIG. 9) that can calculate the state representing whether the time-series data is normal or abnormal (step S109). When a probabilistic model is generated for all the relevance models, the probability information generation unit 105 may read all relevance models from the model information storage unit 114 and may generate a probabilistic model based on the read relevance model. The probability information generation unit 105 stores the generated probabilistic model in the probability information storage unit 115. The probabilistic model and the processing for generating a probabilistic model will be described later with reference to FIG. 9.

Figure 6:
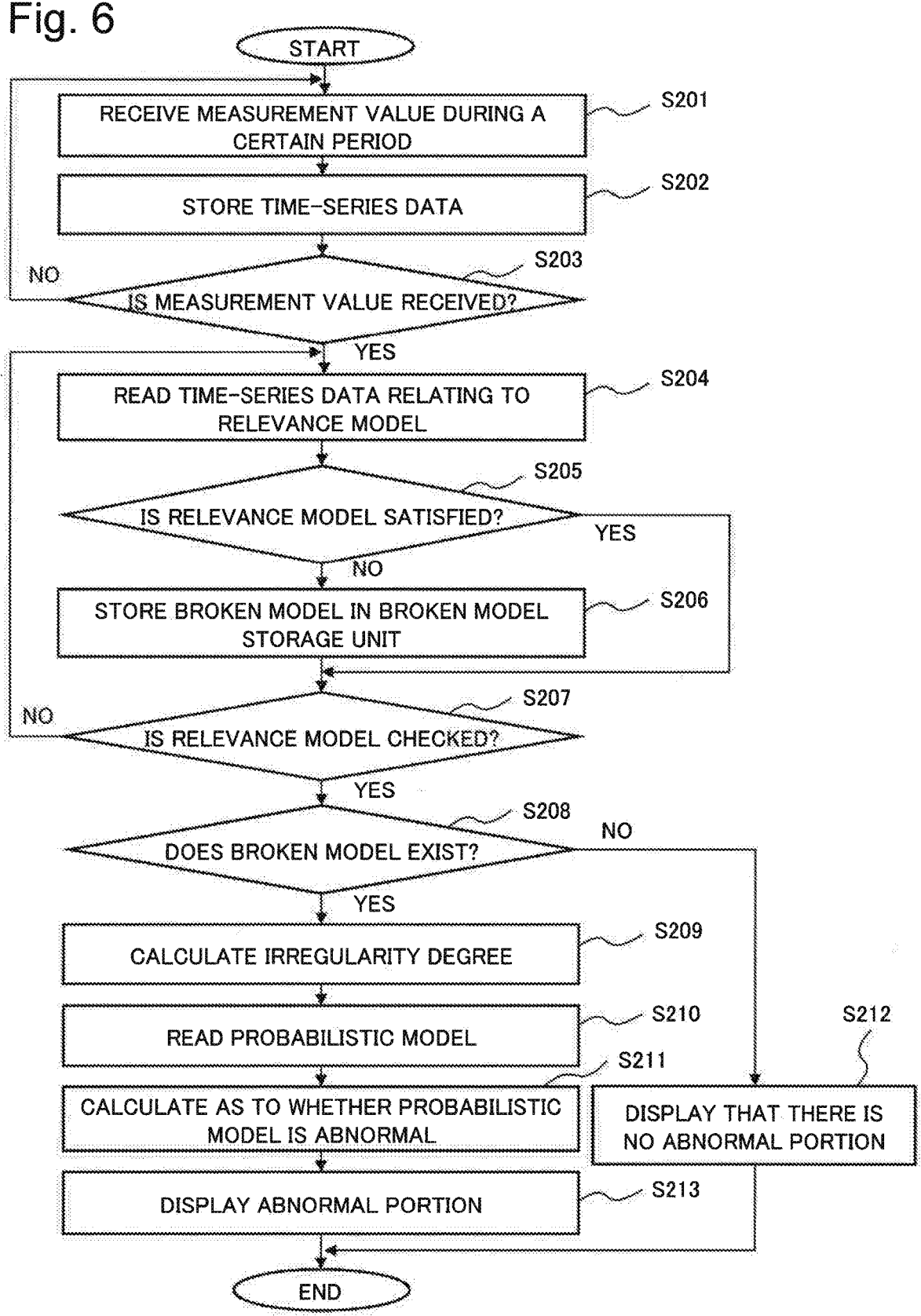
FIG. 6 is a flowchart illustrating a flow of processing for determining whether the time-series data is abnormal or not in the system monitoring apparatus according to the first example embodiment.

Subsequently, the processing for determining whether each measurement value (time-series data) is abnormal or not in the system monitoring apparatus 101 according to the first example embodiment will be explained with reference to FIG. 6. FIG. 6 is a flowchart illustrating a flow of processing for determining whether the time-series data is abnormal or not in the system monitoring apparatus 101 according to the first example embodiment.

In the following description, for the convenience of explanation, it is assumed that a relevance model has been stored in the model information storage unit 114, and that a probabilistic model has been stored in the probability information storage unit 115. It is assumed that the index input unit 102 receives the measurement value during a certain period (monitoring period of time) from the sensor 120. The index input unit 102 may read the time-series data during a certain period from the time-series storage unit 112.

The index input unit 102 receives the measurement value (performance information, observation value) during a certain period of time from the sensor 120 (step S201). For example, the index input unit 102 stores the received measurement value as time-series data in the chronological order in the time-series storage unit 112 (step S202).

For example, when the measurement values are received from all the sensors 120, the index input unit 102 determines whether or not measurement values have been received from all the sensors 120 (step S203). When there is a sensor 120 from which a measurement value has not yet been received (NO in step S203), the index input unit 102 repeats the processing shown in step S201 and step S202.

When the measurement values has been received from all the sensors 120 (YES in step S203), the break detection unit 107 reads a relevance model from a model information storage unit 114 that can store relevance model information as exemplified in FIG. 4

The break detection unit 107 reads the time-series data (exemplified in FIG. 3) related to the read relevance model (exemplified in FIG. 4) from the time-series storage unit 112 (step S204). For example, with regard to the relevance model identified by the relevance model ID "2" that can uniquely identify relevance model, the break detection unit 107 reads the time-series data identified by the time-series ID "2" and the time-series data identified by the time-series ID "5". For example, as shown in FIG. 3, the time-series data identified by the time-series ID "2" is time-series data during a certain period relating to the measurement item (more specifically, the sensor) "humidity" associated with the time-series ID "2".

The break detection unit 107 determines whether or not the read relevance model is satisfied for time-series data during a certain period (step S205). For example, the break detection unit 107 applies a read relevance model (exemplified in the relevance model ID "2" in FIG. 4) to the time-series data (for example, time-series ID "5") during a certain period, thus estimating the time-series data (for example, time-series ID "2"). The break detection unit 107 calculates an error between the time-series data during a certain period and the estimated time-series data and determines whether or not the read relevance model is satisfied based on the calculated error.

In a case where the relevance model is not satisfied for the time-series data during a certain period (NO at step S205), the break detection unit 107 sets the read relevance model in a broken model indicating that the relevance model is not satisfied for the time-series data during the certain period. The break detection unit 107 stores the broken model in the broken model storage unit 117 (step S206).

When a determination is made as to whether relevance models are satisfied for all the relevance models, the break detection unit 107 determines whether relevance model is satisfied for all relevance models (step S207). More specifically, the break detection unit 107 determines whether a relevance break has occurred or not based on the time-series data during the certain period for all the relevance models.

When there still remains a relevance model for which a relevance break has not yet been determined (NO in step S207), the break detection unit 107 repeats the processing shown in step S204 to step S206.

When a determination is made as to whether the relevance break occurs for all the relevance models (YES in step S207), the break detection unit 107 determines whether or not a broken model exists by performing processing for, e.g., referring to the broken model storage unit 117 (step S208).

In a case where any broken model does not exist (NO in step S208), the system monitoring apparatus 101 outputs (for example, displays) a message indicating "there is no abnormal portion" (step S212).

When there is a broken model (YES in step S208), the irregularity-degree calculation unit 108 calculates the irregularity degree with regard to the time-series data on the basis of whether the relevance model is a broken model or not (step S209). The irregularity degree and the calculation processing of the irregularity degree will be described later with reference to FIG. 7.

The abnormality determination unit 109 reads the probabilistic model (exemplified in FIG. 9) from the probability information storage unit 115 (step S210). Based on the irregularity degree calculated by irregularity-degree calculation unit 108 and read probabilistic model, the abnormality determination unit 109 calculates whether each vertex (for example, the sensor 120) included in the probabilistic model is abnormal (step S211). The details of the probabilistic model will be described later with reference to FIG. 9.

For example, the abnormal portion output unit 110 outputs an item (portion, the sensor 120) on the time-series data determined to be abnormal by the abnormality determination unit 109 (step S213).

Subsequently, the relevance model, the probabilistic model, and the broken model will be described in details with reference to an example. First, the relevance model and the processing for generating the relevance model will be described.

For convenience of explanation, it is assumed that the two pieces of time-series data are time-series data x, time-series data y. It is assumed that the relevance between the time-series data x and the time-series data y is expressed by a relevance model "$y = a \times x + b$" (where a and b are constants).

Based on the read time-series data (for example, the time-series data during a normal period), the model information generation unit 104 calculates the constants "a, b" in accordance with the procedure (more specifically, least squares method) for minimizing the sum of squared error of relevance model. For example, the model information generation unit 104 generates relevance model information, as shown in FIG. 4 for example, with regard to the calculated constants "a, b", and stores the generated relevance model information to the model information storage unit 114. An approximate value (prediction value) z of y in the case where x is an input can be calculated in accordance with "$a \times x + b$", and an error can be calculated as a difference between y and z.

Further, the model information generation unit 104 may determine whether the calculated relevance model is appropriate or not in accordance with whether the sum of squares of error satisfies a predetermined condition (for example, whether the sum of squares of error is less than or equal to a predetermined threshold value). For example, when the sum of squares of error is greater than the predetermined threshold value, the model information generation unit 104 determines that the calculated relevance model is not appropriate as a relevance model for estimating time-series data. In this case, the model information generation unit 104 does not need to store the relevance model in the model information storage unit 114.

Figure 7:
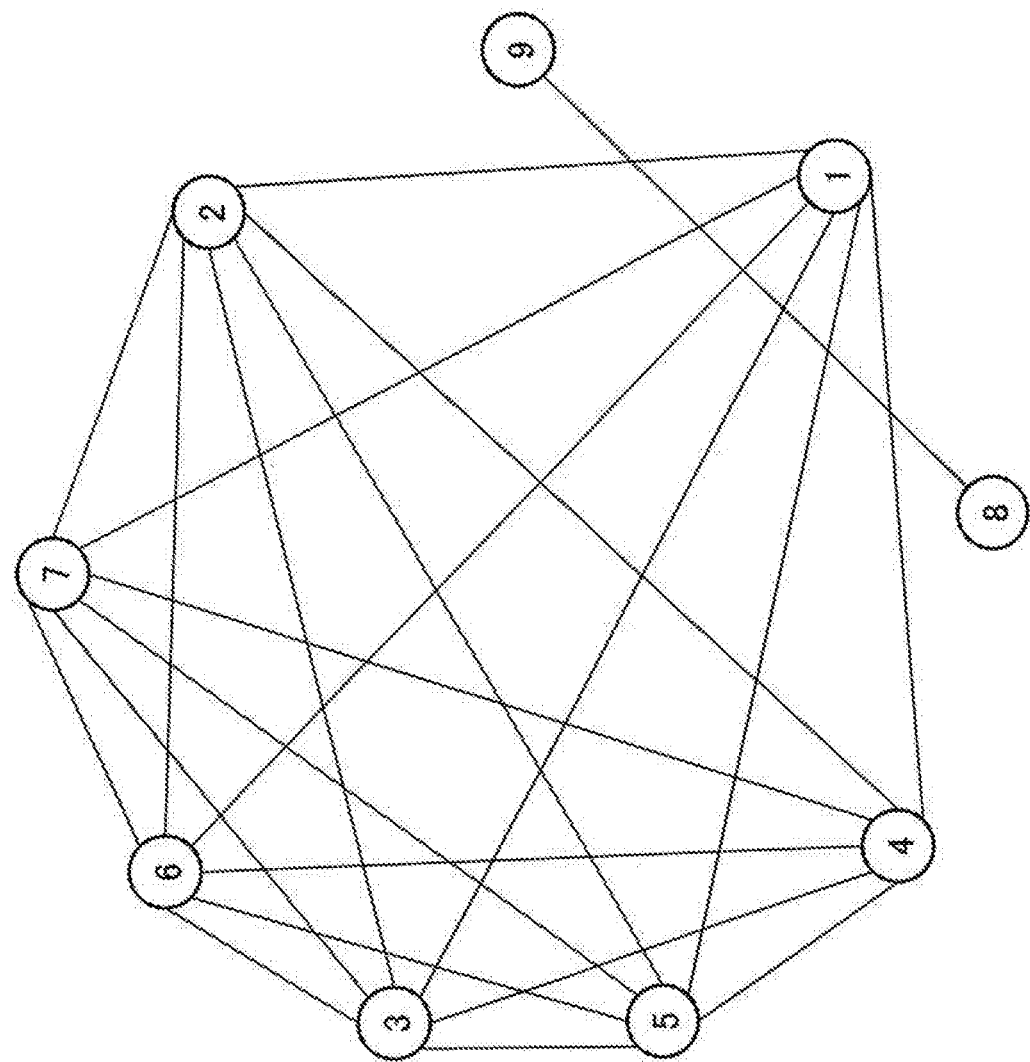
FIG. 7 is a diagram conceptually illustrating an example of association information.

The model information generation unit 104 may generate association information (FIG. 7) that conceptually represents an appropriate relevance model as the relevance model for estimating time-series data. FIG. 7 is a diagram conceptually illustrating an example of association information.

A plurality of vertexes (nodes, numbers surrounded by circles) and edges connecting vertexes (lines connecting edges and numbers) are exemplified in the association information exemplified in FIG. 7. Vertexes represent any given pieces of time-series data (or the sensor 120 calculating the time-series data). Edges indicates that the relevance model between the time-series data represented by the vertexes at both ends of the edge is appropriate as a relevance model for estimating the time-series data. In accordance with whether the above sum of squares of error is greater than a predetermined threshold value, the model information generation unit 104 sets an edge connecting two vertexes representing the time-series data (or the sensors 120 which calculate the time-series data) related to the relevance model.

Figure 8:
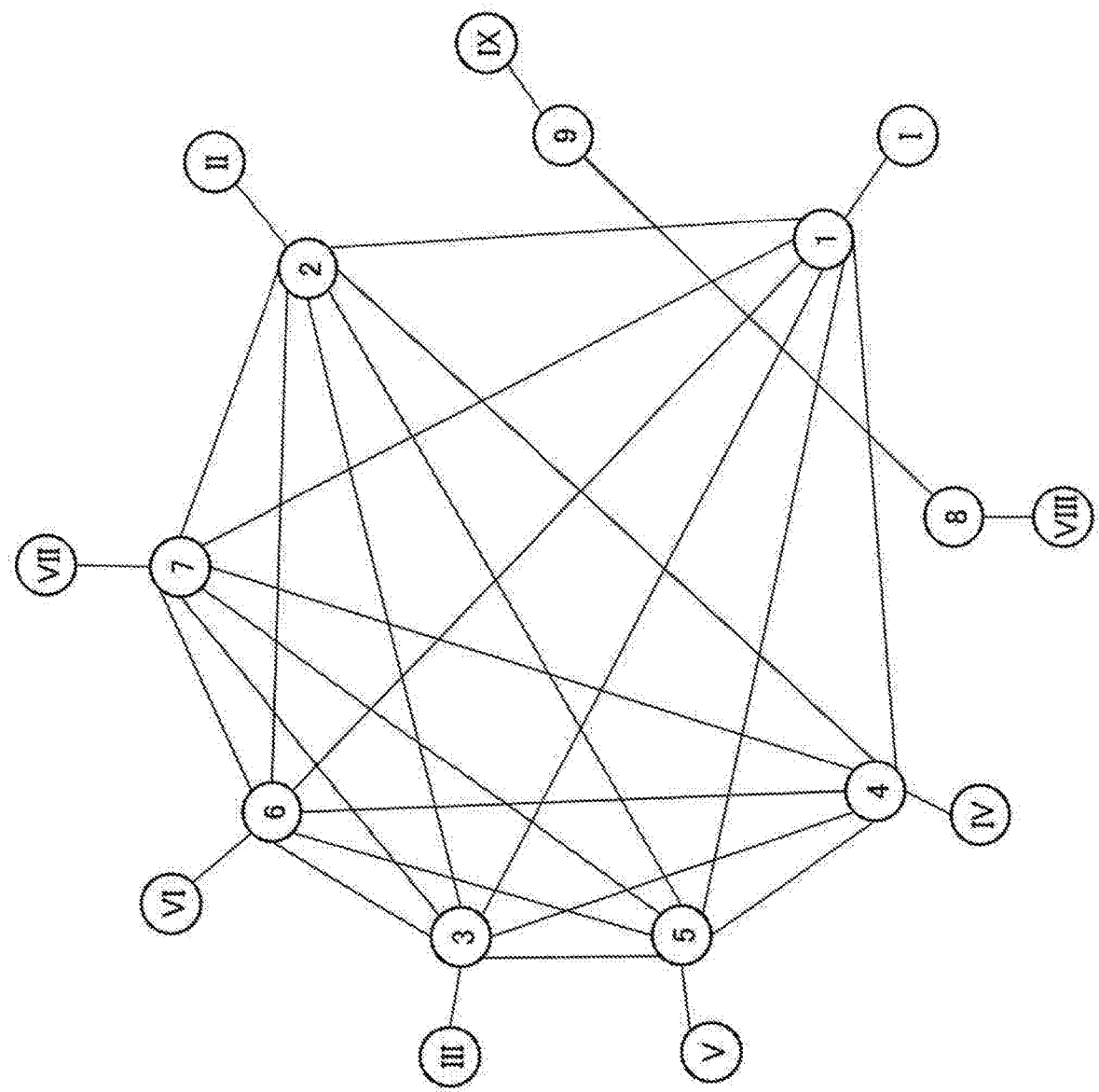
FIG. 8 is a diagram conceptually illustrating an example of association information.

In the association information, as shown in, for example, FIG. 8, a sensor (Arabic numeral surrounded by a circle) and time-series data (Roman numeral surrounded by a circle) may be represented as vertex respectively. FIG. 8 is a diagram conceptually illustrating an example of association information.

In the association information exemplified in FIG. 8, a vertex representing a sensor is adjacent to a vertex representing time-series data. This represents that the sensor (arabic number surrounded by the circle) measures the time-series data represented by the vertex (roman numeral surrounded by the circle) adjacent to the vertex. An edge connecting between vertexes represented by Arabic numerals surrounded by circles indicates that the sum of squares of error on the relevance model between the time-series data measured by the sensor represented by the vertexes satisfies a predetermined condition.

More specifically, in the association information exemplified in FIG. 7 and FIG. 8, the vertex connected to both ends of the edge indicates that the time-series data represented by the vertex has relevance (or correlation) satisfying a predetermined condition.

Figure 9:
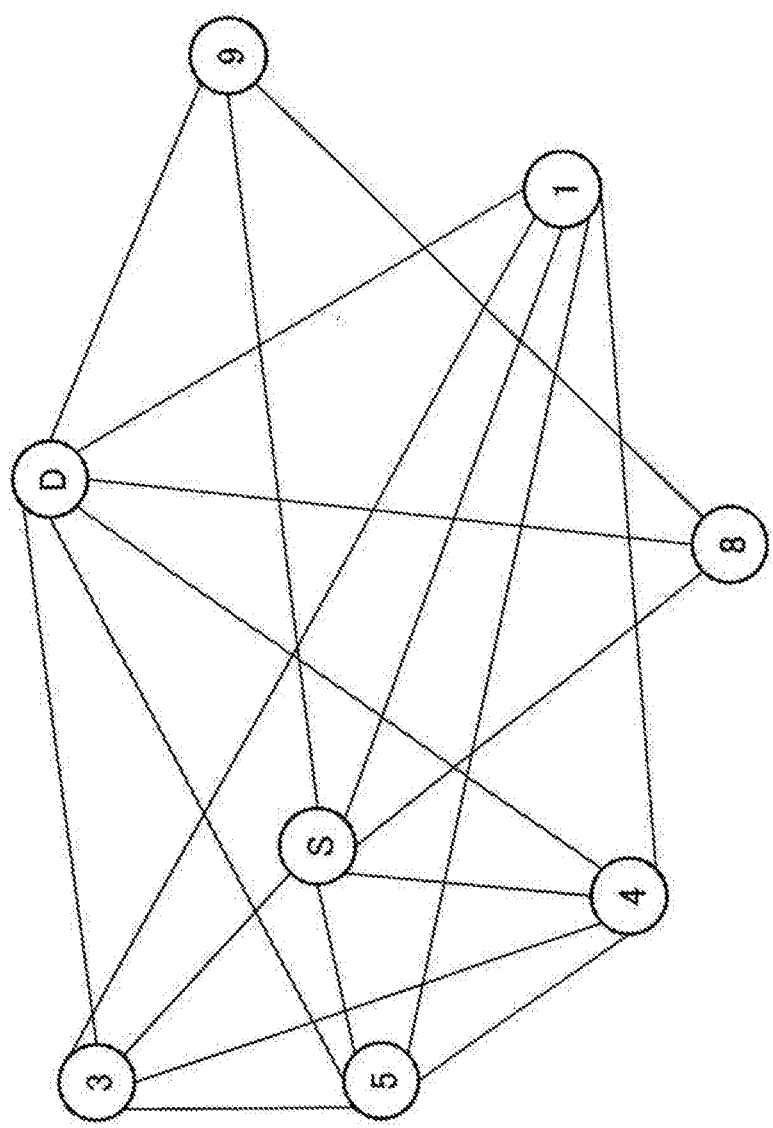
FIG. 9 is a diagram conceptually illustrating an example of a probabilistic model.

Subsequently, a probabilistic model and the processing for generating the probabilistic model will be explained with reference to FIG. 9. FIG. 9 is a diagram conceptually illustrating an example of a probabilistic model.

The probabilistic model is calculated based on the generated relevance model (association information, exemplified in the FIG. 7, FIG. 8). The vertexes in the probabilistic model includes the vertexes (representing time-series data or sensors) shown in FIG. 7 and two vertexes (more specifically, vertex S and vertex D). For convenience of explanation, in FIG. 9, the descriptions about the vertex 2, the vertex 6, the vertex 7, and the edges among the three vertexes are omitted. Edges in the probabilistic model include edges in the generated association information (more specifically, a relevance model satisfying a predetermined condition), edges connecting the vertex S and each vertex in the association information (exemplified in FIG. 7), and edges connecting the vertex D and each vertex in the association information.

For the sake of explanation, the edges connecting the vertex S and each vertex in the association information will be denoted as second edges, the edges connecting the vertex D and each vertex in the association information will be denoted as first edges, and the edges connecting the vertexes in the association information (exemplified in FIG. 7) will be denoted as third edges. The vertex S may be denoted as second vertex. The vertex D may be denoted as third vertex.

Vertexes included in the association information (exemplified in FIG. 7) may be denoted as first vertexes.

Each edge in the probabilistic model is weighted in accordance with processing described later. For example, the weights given to each second edge and each third edge are weights based on the irregularity degree described above. For example, the weight given to each first edge is a weight based on whether the edge exists or not. Processing for giving the weights will be described later.

Before explaining the weights of the edges in the probabilistic model, the Markov random field used in the present example embodiment will be explained.

The Markov random field is a probabilistic model in which only vertexes adjacent to each other affect each other in terms of probability.

For example, it is assumed that the generated probabilistic model is Markov random field. A vertex is denoted as v, and a set of vertexes included in the probabilistic model is denoted as V. In the set of vertexes V, a set of vertexes other than the vertex v is denoted as "V\{v}". Further, a set of vertexes adjacent to the vertex v is denoted as T.

In the case of Markov random field, Eqn. 1 holds because only the adjacent vertexes affect each other in terms of probability. More specifically, the following equation holds:

$$p(v|V\backslash\{v\}) = p(v|T) \qquad \text{(Eqn. 1),}$$

(however, p denotes probability. "|" denotes a conditional probability).

For example, in the probabilistic model on the association information exemplified in FIG. 8, the vertex 2 is adjacent to the vertex 1, the vertex 3, the vertex 4, the vertex 5, the vertex 6, the vertex 7, and the vertex "II". The vertex 2 is not adjacent to vertexes such as the vertex 8, the vertex 9, and the like. As a result, in the case where it is assumed to be Markov random field, Eqn. 2 holds. More specifically, the following equation holds:

$$p(2|V\backslash\{2\}) = p(2|II,1,3,4,5,6,7) \qquad \text{(Eqn. 2).}$$

Subsequently, the irregularity degree and the processing for calculating the irregularity degree will be described in details with reference to the association information exemplified in FIG. 7.

When the model information generation unit 104 generates the association information exemplified in FIG. 7, the break detection unit 107 determines whether each relevance model represented by edges included in the association information is satisfied with regard to the time-series data during a certain period as described above.

For the convenience of explanation, it is assumed that the break detection unit 107 determines that the relevance model including the following nine edges is not satisfied for a time-series data during a certain period. The nine edges are:
between the vertex 3 and the vertex 5,
between the vertex 3 and the vertex 6,
between the vertex 6 and the vertex 7,
between the vertex 2 and the vertex 5,
between the vertex 5 and the vertex 7,
between the vertex 2 and the vertex 7,
between the vertex 8 and the vertex 9,
between the vertex 1 and the vertex 4, and
between the vertex 1 and the vertex 7.

Figure 10:
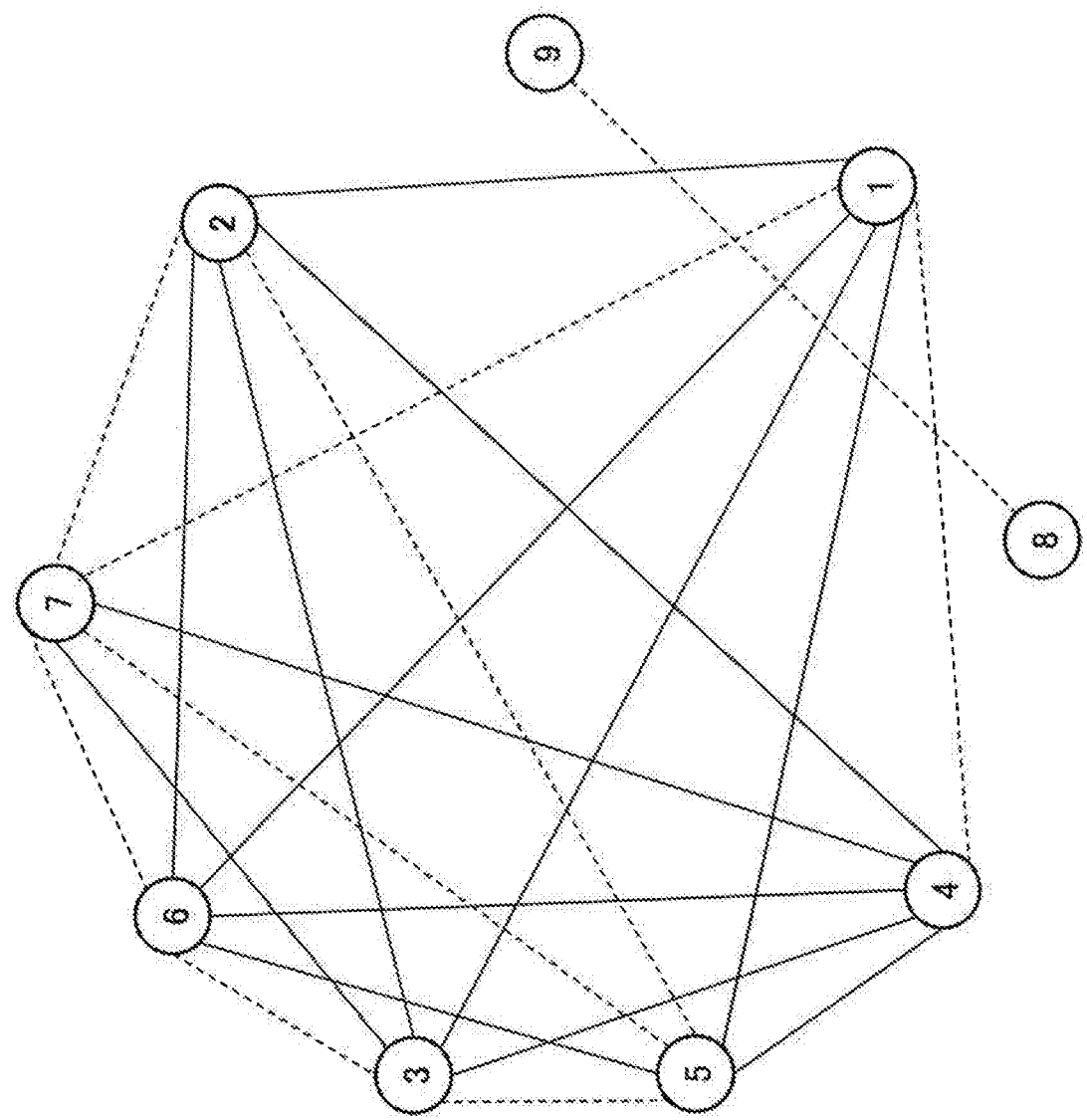
FIG. 10 is a diagram conceptually illustrating an example of association information.

In this case, in accordance with a mode for distinguishing the relevance model to be a broken model (using dotted lines and the like), the break detection unit 107 may generate the association information as exemplified in FIG. 10. FIG. 10 is a diagram conceptually illustrating an example of association information.

For example, the irregularity degree A with regard to the vertex x in the association information can also be calculated in accordance with Eqn. 3:

(The irregularity degree $A$)=(the number of edges representing a broken model connected to $x$)÷(the number of all the edges connected to $x$)  (Eqn. 3).

More specifically, the irregularity degree A exemplified in Eqn. 3 represents the ratio of the edges representing the broken model out of the edges connected to vertex x. For example, the irregularity degree of the vertex 7 in FIG. 10 can be calculated as approximately 0.667 (=4÷6) in accordance with Eqn. 3.

For example, the break detection unit 107 calculates the irregularity degree of the vertex in the association information, and generates irregularity degree information as shown in FIG. 11 by associating the calculated irregularity degree with the vertex ID (time-series ID or measurement item (index)) identifying the vertex. FIG. 11 is a diagram conceptually illustrating an example of irregularity degree information. The irregularity degree in the irregularity degree information exemplified in FIG. 11 is not the irregularity degree calculated based on the association information exemplified in FIG. 10 but is the irregularity degree that has been set for the convenience of explanation.

In the irregularity degree information, the vertex ID (in other words, the time-series ID or the measurement item (index) and the like) and the irregularity degree of the vertex identified by the vertex ID are associated with each other. For example, in the irregularity degree information exemplified in FIG. 11, the vertex ID "1" is associated with the irregularity degree "0.333333". This represents that the break detection unit 107 indicates that the irregularity degree calculated in accordance with, for example, Eqn. 3 with regard to the vertex identified by the vertex ID "1" is "0.333333".

Subsequently, processing for setting weights to the second edge, the first edges, and the third edges in the probabilistic model, and processing for determining whether the sensor 120 measuring the time-series data is abnormal or not in the abnormality determination unit 109 will be explained.

For the convenience of explanation, it is assumed that the number of vertexes is denoted as N. It is assumed that the irregularity degree for the vertex i (however, $1 \leq i \leq N$) is denoted as $x_i$, and the state relating to the vertex i is denoted as $y_i$. More specifically, it is assumed that $y_i$ indicates a label capable of identifying whether the vertex i is normal (for example, 0) or abnormal (for example, 1).

In a case where the irregularity degree is $x_i$ (however, $1 \leq i \leq N$), for example, the abnormality determination unit 109 calculates $y_i$ (however, $1 \leq i \leq N$) that occurs with the highest probability. More specifically, the abnormality determination unit 109 calculates $y_1, y_2, \ldots, y_N$ which maximizes the posterior probability $p(y_1, y_2, \ldots, y_N | x_1, x_2, \ldots, x_N)$.

In accordance with Bayes' theorem, $p(y_1, y_2, \ldots, y_N | x_1, x_2, \ldots, x_N)$ can be transformed into Eqn. 4. However, $\propto$ denotes a proportional relationship.

$$p(y_1, \ldots, y_N | x_1, \ldots, x_N) \propto \qquad \text{(Eqn. 4)}$$
$$p(x_1, \ldots, x_N | y_1, \ldots, y_N) p(y_1, \ldots, y_N) =$$
$$\prod_{i=1}^{N} p(x_i | y_i) p(y_1, \ldots, y_N)$$

When the probabilistic model is assumed to be Markov random field, the vertexes affect only the vertexes adjacent to the vertex in terms of probability in the probabilistic model as exemplified in FIG. 9. The logarithm of the rightmost side of Eqn. 4 is given by Eqn. 5. However, the base of the log function is, for example, the Napier's constant.

$$\sum_{i=1}^{N} \log(p(x_i | y_i)) + \sum_{(y_m, y_n) \in \varepsilon} \log(p(y_m, y_n)) \qquad \text{(Eqn. 5)}$$

$\varepsilon$ represents a set of edges in the probabilistic model.

The abnormality determination unit 109 derives $y_1, y_2, \ldots, y_N$ in the case where the value calculated in accordance with Eqn. 5 is the maximum. "Eqn. 5×(−1)" is called energy function. By giving $p(x_i|y_i)$ and $p(y_m, y_n)$ to Eqn. 5, the $y_1, y_2, \ldots, y_N$ maximizing Eqn. 5 can be reduced to the problem of finding the maximum flow relating to the weighted graph. More specifically, $y_1, y_2, \ldots, y_N$ maximizing Eqn. 5 can be reduced to the problem of deriving a minimum cut for minimizing the weight of the cut in a case where the weighted graph thus calculated is separated into two parts.

In this case, for example, the problem of deriving $y_1, y_2, \ldots, y_N$ maximizing Eqn. 5 can be reduced to the problem of deriving the maximum flow extending from the vertex S to the vertex D on the basis of the probabilistic model exemplified in FIG. 9. More specifically, the problem is reduced to the minimum cut problem for separating the graph exemplified in FIG. 9 into two sets while reducing the weights of the cut edges. In this case, $p(x_i|y_i)$ corresponds to the weights relating to the second edges and the third edges in the probabilistic model. In this case, $p(y_m, y_n)$ corresponds to the weight relating to the first edges in the probabilistic model.

In this case, for example, a beta distribution defined using a probability density shown in Eqn. 6 and a gamma distribution defined using the probability density shown in Eqn. 7 can be used as probability distribution defining $p(x_i|y_i)$.

$$\text{Beta}(x | a, b) = \frac{\Gamma(a+b)}{\Gamma(a)\Gamma(b)} x^{a-1}(1-x)^{b-1} \qquad \text{(Eqn. 6)}$$

$$\text{Gamma}(x | k, \theta) = x^{k-1} \frac{e^{-x/\theta}}{\Gamma(k)\theta^k}, x > 0 \qquad \text{(Eqn. 7)}$$

However, $\Gamma$ represents the gamma function. "/" represents division. a, b, k, and $\theta$ represent constants.

More specifically, $p(x_i|y_i)$ is a value calculated in a case where x in Eqn. 6 or Eqn. 7 is set as the irregularity degree. For example, when the irregularity degree of the vertex is a large value, the abnormality determination unit 109 calculates a large value calculated in accordance with Eqn. 6 as $p(x_i|y_i)$. For example, when the irregularity degree of the vertex is a small value, the abnormality determination unit 109 calculates a small value calculated in accordance with Eqn. 6 as $p(x_i|y_i)$.

Hereinafter, $p(x_i|y_i)$ is denoted as the first degree in some cases. The first degree represents a degree (probability) that, when the vertex (time-series data, sensor) is in a particular state, the irregularity degree is a particular value. More specifically, for example, the first degree represents a degree (probability) that, when the vertex (time-series data, sensor) is normal, the irregularity degree is a particular value. For example, the first degree represents a degree (probability) that, when the vertex (time-series data, sensor) is abnormal, the irregularity degree is a particular value.

For example, when the irregularity degree is calculated in accordance with Eqn. 3, the irregularity degree is a value equal to or more than 0 and equal to or less than 1. On the other hand, an input of the beta distribution must be a value equal to or more than 0 and equal to or less than 1. Therefore, when calculating the irregularity degree in accordance with Eqn. 3, the abnormality determination unit 109 may calculate $p(x_i|y_i)$ in accordance with the beta distribution exemplified in Eqn. 6. In a case where the irregularity degree is not equal to or more than 0, or is not equal to or less than 1, the abnormality determination unit 109 may calculate $p(x_i|y_i)$ in accordance with the beta distribution exemplified in Eqn. 7.

When calculating $p(x_i|y_i)$ in accordance with Eqn. 6, the abnormality determination unit 109 may calculate the constant a and the constant b on the basis of the average of irregularity degree and the variance of the irregularity degree. When calculating $p(x_i|y_i)$ in accordance with Eqn. 7, the abnormality determination unit 109 may calculate the constant k and the constant θ in accordance with the maximum likelihood estimation procedure.

The Ising model exemplified in Eqn. 8 can be used as the model defining $p(y_m, y_n)$.

$$P(y_m, y_n) = e^{w_{m,n} y_m y_n} \tag{Eqn 8}$$

However, e represents the base of the natural logarithm (Napier number). $W_{m,n}$ represents the degree at which the vertex m and the vertex n are related to each other.

The Ising model has a property that multiple vertexes adjacent to each other (for example, the vertex m, the vertex n) are like to be such that $y_m$ and $y_n$ have the same value.

For example, $p(y_m, y_n)$ calculated in accordance with Eqn. 8 is the value to be calculated, depending on whether $y_m$ and $y_n$ for mutually adjacent vertexes are the same or different. For example, in a case where $y_m$ and $y_n$ have the same value with regard to Eqn. 8, a value higher than a case where $y_m$ and $y_n$ have different values is calculated.

Hereafter, $p(y_m, y_n)$ may be denoted as the second degree in some cases. More specifically, the second degree is the extent of relation between the vertexes (time-series data, sensor).

As described above, the abnormality determination unit 109 calculates the weights of the edges included in the probabilistic model as exemplified in FIG. 9, and applies the algorithm for solving the maximum flow problem to the weighted probabilistic model thus calculated, so that the abnormality determination unit 109 derives $y_1, y_2, \ldots, y_N$ exemplified in FIG. 12. FIG. 12 is a diagram conceptually illustrating determination information calculated by the abnormality determination unit 109.

The abnormality determination unit 109 may display the probabilistic model (graph) exemplified in FIG. 9 on a display unit 122. The abnormality determination unit 109 may display the probabilistic model on the display unit 122 in a mode of displaying the weight of the edge near the edge included in the graph.

In determination information exemplified in FIG. 12, the vertex ID "2" is associated with the state "normal". This represents that the state for the vertex ID "2" calculated by the abnormality determination unit 109 is normal. As in the explanation about FIG. 11, the vertex ID represents an identifier that can identify a time-series ID, a measurement item, or a performance index.

The system monitoring apparatus 101, for example, determines that the time-series data about the vertex ID "7" where relevance break is concentrated is abnormal by executing the processing described above. Even in a case where there is a relevance break that is not related to abnormality in the monitoring target 121 with regard to the vertex ID "5", the system monitoring apparatus 101 does not determine that it is abnormal. Further, the system monitoring apparatus 101 calculates $y_1, y_2, \ldots, y_N$ maximizing Eqn. 5 as described above to calculate whether it is normal or abnormal, and therefore, any threshold value for determination between normal and abnormal is not set.

More specifically, in accordance with the system monitoring apparatus 101 of the present example embodiment, even when there occurs a relevance break that is not related to abnormality in the monitoring target 121, an abnormal portion can be identified without setting any threshold value. This is because the relevance model (dependency relationship) between performance indexes (vertexes) is used, so that even if a break occurs in the relevance model which is not related to the actually occurring abnormality, the effect of break based on the information on adjacent performance indexes can be reduced. The reason for this is that the system monitoring apparatus 101 calculates the state in which the posterior probability is the maximum as exemplified in FIG. 5, so that even if there is no threshold value that is a base for determining normal or abnormal, the most appropriate state in terms of probability can be calculated.

More specifically, in accordance with the system monitoring apparatus 101 according to the present example embodiment, a factor of failure in the monitoring target can be identified.

The reason for this is that the system monitoring apparatus 101 calculates the state of the sensor 120 based on the irregularity degree and the relevance among the plurality of sensors 120.

Second Example Embodiment

Subsequently, the second example embodiment of the present invention for realizing the main functions of the first example embodiment described above will be explained.

In the following explanation, the characteristic portions relating to the present example embodiment will be mainly explained, and the same reference numerals are given to the same constituent elements those of the first example embodiment described above, and redundant explanation thereabout will be omitted.

Figure 13:
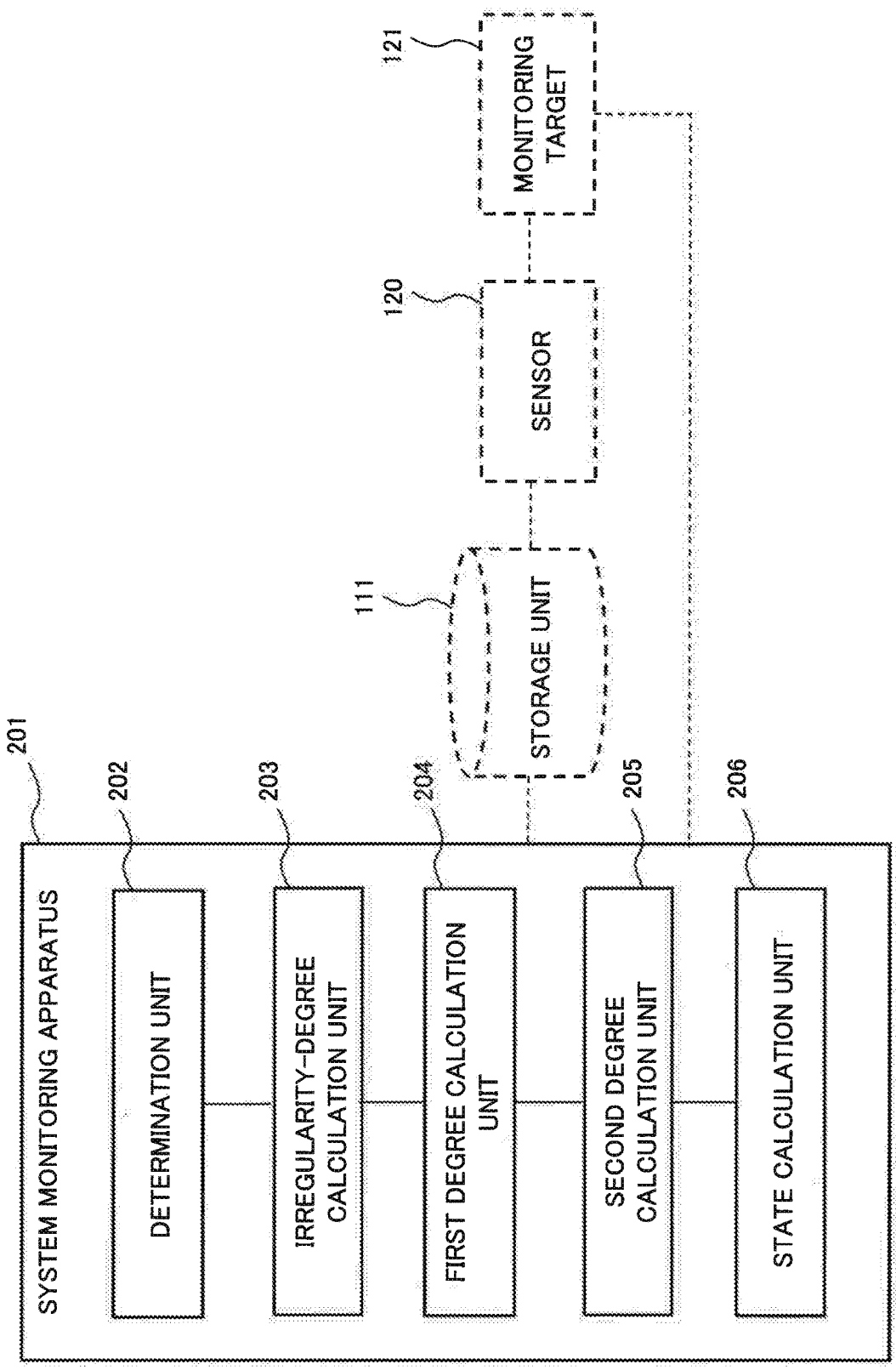
FIG. 13 is a block diagram illustrating the configuration of a system monitoring apparatus according to a second example embodiment of the present invention.

The configuration of a system monitoring apparatus 201 according to the second example embodiment will be described with reference to FIG. 13. FIG. 13 is a block diagram illustrating the configuration of the system monitoring apparatus 201 according to the second example embodiment of the present invention.

The system monitoring apparatus 201 according to the second example embodiment includes a determination unit 202, an irregularity-degree calculation unit 203, a first degree calculation unit 204, a second degree calculation unit 205, and a state calculation unit 206.

For example, the determination unit 202 receives a relevance model representing relevance between a plurality of sets of time-series data (represented as "first time-series data") in which the monitoring target is measured in the first time period (for example, normal period). Further, the determination unit 202 receives the time-series data (referred to as "second time-series data") measured in the second time period (for example, monitoring period) with regard to the time-series data related to the received relevance model. The set is an expression including time-series data measured during a certain period by a plurality of sensors of a certain type.

The determination unit 202 estimates time-series data by applying the received relevance model with regard to the received second time-series data and calculates an error between the received second time-series data and the estimated time-series data.

In this case, for example, the determination unit 202 reads the time-series ID associated with the relevance model on the basis of the relevance model information as exemplified in FIG. 4, and specifies the measurement item associated with the read time-series ID on the basis of the time-series information as exemplified in FIG. 3. Subsequently, the determination unit 202 estimates time-series data by applying the relevance model to the time-series data measured by the specified measurement item (sensor 120) during the second period of time.

The determination unit 202 determines whether the received relevance model is satisfied based on whether or not the calculated error is equal to or greater than a predetermined threshold value. For example, in a case where the calculated error is equal to or more than a predetermined threshold value, the determination unit 202 determines that the relevance model is not satisfied for the time-series data measured in the second period of time. In a case where the calculated error is less than the predetermined threshold value, the determination unit 202 determines that the relevance model is satisfied for the time-series data measured in the second period of time.

For example, the determination unit 202 can be realized by using the break detection unit 107 in the system monitoring apparatus 101 according to the first example embodiment.

Subsequently, the irregularity-degree calculation unit 203 calculates an irregularity degree that represents the degree related to the relevance that the second time-series data is not satisfied (abnormal) on the basis of the number of received relevance models and the number of relevance models determined not to be satisfied on the time-series data measured during the second time period.

For example, the irregularity-degree calculation unit 203 can be realized by the abnormality calculation unit 106 in the system monitoring apparatus 101 according to the first example embodiment.

Subsequently, when the second time-series data is normal or abnormal based on the irregularity degree calculated by the irregularity-degree calculation unit 203, the first degree calculation unit 204 calculates a first degree representing a degree that the irregularity degree calculated by the irregularity-degree calculation unit 203 is a particular value.

For example, the first degree calculation unit 204 can realize processing for calculating the first degree in accordance with processing in which the abnormality determination unit 109 in the system monitoring apparatus 101 according to the first example embodiment calculates the value of $p(x_i|y_i)$ in accordance with Eqn. 6 or Eqn. 7.

Subsequently, the second degree calculation unit 205 calculates the second degree representing the degree that the second time-series data related to the relevance model is related to each other, on the basis of the received relevance model.

For example, the second degree calculation unit 205 can realize processing for calculating the second degree in accordance with processing in which the abnormality determination unit 109 in the system monitoring apparatus 101 according to the first example embodiment calculates a value of $p(y_m, y_n)$ in accordance with Eqn. 8 on the basis of the relevance model.

Subsequently, the state calculation unit 206 calculates whether or not the first time-series data is normal on the basis of the first degree calculated by the first degree calculation unit 204 and the second degree calculated by the second degree calculation unit 205.

For example, the state calculation unit 206 can be realized in accordance with processing in which the abnormality determination unit 109 in the system monitoring apparatus 101 derives, for example, $y_1, y_2, \ldots, y_N$ maximizing Eqn. 5 in accordance with the procedure for deriving the minimum cut on the basis of the probabilistic model as exemplified in FIG. 9.

Subsequently, effects on the system monitoring apparatus 201 according to the second example embodiment will be explained.

In accordance with the system monitoring apparatus 201 according to the present example embodiment, the factor of the failure in the monitoring target can be identified.

The reason for this is that the system monitoring apparatus 201 calculates the state of the sensor 120 on the basis of the irregularity degree and the relevance between the plurality of sensors 120.

(Hardware Configuration Example)

A configuration example of hardware resources that realize system monitoring apparatus in the above-described example embodiments of the present invention using a single calculation processing apparatus (an information processing apparatus or a computer) will be described. However, the system monitoring apparatus may be realized using physically or functionally at least two calculation processing apparatuses. Further, the system monitoring apparatus may be realized as a dedicated apparatus.

Figure 14:
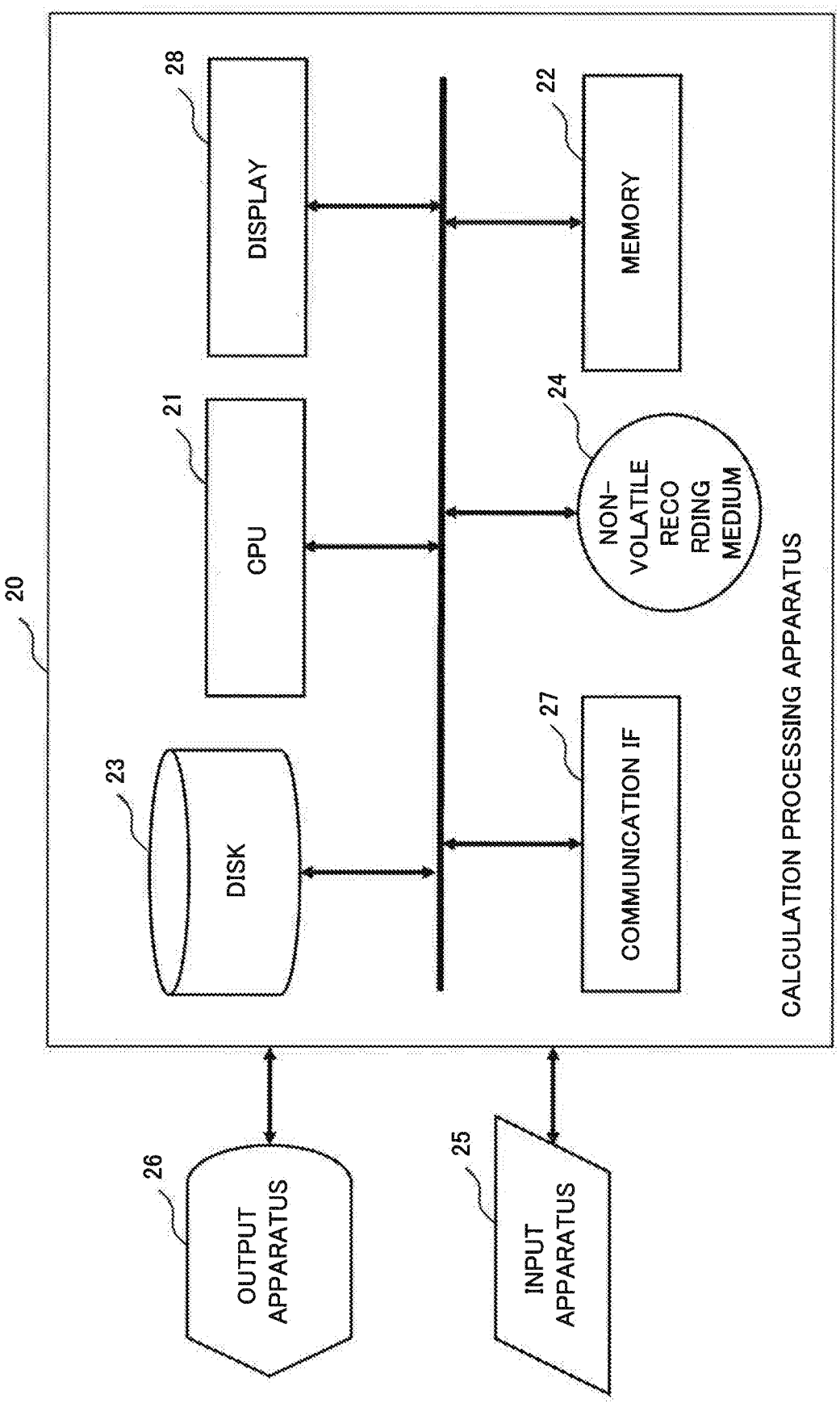
FIG. 14 is a block diagram schematically illustrating a hardware configuration of a calculation processing apparatus capable of realizing a system monitoring apparatus according to each example embodiment.

FIG. 14 is a block diagram schematically illustrating a hardware configuration of a calculation processing apparatus capable of realizing the system monitoring apparatus according to first and second example embodiments. A calculation processing apparatus 20 includes a central processing unit (CPU) 21, a memory 22, a disc 23, and a non-transitory recording medium 24. A calculation processing apparatus 20 further includes an input apparatus 25, an output apparatus 26, a communication interface (hereinafter, expressed as a "communication I/F") 27 and a display 28. The calculation processing apparatus 20 can execute transmission/reception of information to/from another calculation processing apparatus and a communication apparatus via the communication I/F 27.

The non-volatile recording medium 24 is, for example, a computer-readable Compact Disc, Digital Versatile Disc. The non-volatile recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the display 28. When a program outputs to the outside, the CPU 21 outputs an output result to the output apparatus 26. When a program inputs from the outside, the CPU 21 reads the program from the input apparatus 25. The CPU 21 interprets and executes an system monitoring program (FIG. 5 or FIG. 6) present on the memory 22 corresponding to a function (processing) indicated by each unit exemplified in FIG. 2 or FIG. 13 described above. The CPU 21 sequentially executes the processing described in each example embodiment of the present invention.

In other words, in such a case, it is conceivable that the present invention can also be made using the system monitoring program. Further, it is conceivable that the present invention can also be made using a computer-readable, non-transitory recording medium storing the system monitoring program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2015-034631, filed on Feb. 25, 2015, the disclosure of which is incorporated herein in its entirety.

DESCRIPTION OF SYMBOLS 20 calculation processing apparatus
21 CPU
22 memory
23 disk
24 non-volatile recording medium
25 input apparatus
26 output apparatus
27 communication IF
28 display
101 system monitoring apparatus
102 index input unit
103 information generation unit
104 model information generation unit
105 probability information generation unit
106 abnormality calculation unit
107 break detection unit
108 irregularity-degree calculation unit
109 abnormality determination unit
110 abnormal portion output unit
111 storage unit
112 time-series storage unit
113 information storage unit
114 model information storage unit
115 probability information storage unit
116 abnormality storage unit
117 broken model storage unit
118 irregularity-degree storage unit
119 abnormal portion storage unit
120 sensor
121 monitoring target
122 display unit
201 system monitoring apparatus
202 determination unit
203 irregularity-degree calculation unit
204 first degree calculation unit
205 second degree calculation unit
206 state calculation unit

The invention claimed is:

1. An abnormality detection apparatus comprising:
a memory configured to store instructions; and
one or more processors connected to the memory and configured to execute the instructions to:
  determine whether a relevance representing a relationship on a plurality of sets of first time-series data measured in a first time period with regard to a monitoring target is satisfied for a plurality of second time-series data measured in a second period of time,
  calculate an irregularity degree representing a degree that the second time-series data is abnormal based on the relevance determined to be satisfied and the relevance determined not to be satisfied,
  calculate a first degree representing a degree that the irregularity degree is a particular value when the second time-series data is normal or abnormal based on the irregularity degree calculated with regard to the second time-series data,
  calculate a second degree representing a degree that the plurality of sets of second time-series data are related, based on the relevance with regard to the first period of time in accordance with the Ising model based on the relevance, and
  to derive whether the second time-series data is normal or abnormal based on the first degree and the second degree and to output an indication as to whether the second time-series data is normal or abnormal to thereby identify whether or not the second time-series data is a factor of a failure of the monitoring target.

2. The abnormality detection apparatus according to claim 1, wherein the one or more processors is configured to determine whether the relevance is satisfied based on an error of a value calculated by applying the relevance to the second time-series data.

3. The abnormality detection apparatus according to claim 2, wherein the one or more processors is configured to calculate the second degree in accordance with whether the plurality of second time-series data are related to the relevance.

4. The abnormality detection apparatus according to claim 2, wherein the one or more processors is configured to calculate the first degree by applying a beta distribution to the irregularity degree.

5. The abnormality detection apparatus according to claim 2, wherein the one or more processors is configured to calculate the first degree by applying a gamma distribution to the irregularity degree.

6. The abnormality detection apparatus according to claim 2, wherein
with regard to a graph including (I) a vertex including (I-i) a first vertex representing the second time-series data, (I-ii) a second vertex different from the first vertex, and (I-iii) a third vertex different from the first vertex and the second vertex, (II) a first edge connecting between the plurality of first vertexes, (III) a second edge connecting between the first vertex and the second vertex, and (IV) a third edge connecting between the first vertex and the third vertex,
the one or more processors is configured to calculate a weight relating to the first edge based on the second degree, calculate the weight relating to the second edge and the third edge on basis of the first degree, calculate a minimum cut minimizing the weight that is cut when the weighted graph is divided into two parts, and calculate whether it is normal or not based on the calculated result.

7. The abnormality detection apparatus according to claim 1, wherein the one or more processors is configured to calculate the second degree in accordance with whether the plurality of second time-series data are related to the relevance.

8. The abnormality detection apparatus according to claim 7, wherein the one or more processors is configured to calculate the first degree by applying a beta distribution to the irregularity degree.

9. The abnormality detection apparatus according to claim 7, wherein the one or more processors is configured to calculate the first degree by applying a gamma distribution to the irregularity degree.

10. The abnormality detection apparatus according to claim 1, wherein the one or more processors is configured to calculate the first degree by applying a beta distribution to the irregularity degree.

11. The abnormality detection apparatus according to claim 1, wherein the one or more processors is configured to calculate the first degree by applying a gamma distribution to the irregularity degree.

12. The abnormality detection apparatus according to claim 1, wherein
with regard to a graph including (I) a vertex including (I-i) a first vertex representing the second time-series data, (I-ii) a second vertex different from the first vertex, and (I-iii) a third vertex different from the first vertex and the second vertex, (II) a first edge connecting between the plurality of first vertexes, (III) a second edge connecting between the first vertex and the second vertex, and (IV) a third edge connecting between the first vertex and the third vertex,
the one or more processors is configured to calculate a weight relating to the first edge based on the second degree, calculate the weight relating to the second edge and the third edge on basis of the first degree, calculate a minimum cut minimizing the weight that is cut when the weighted graph is divided into two parts, and calculate whether it is normal or not based on the calculated result.

13. The abnormality detection apparatus according to claim 12,
wherein the one or more processors is configured to display the weighted graph on a display.

14. An abnormality detection method comprising:
determining whether a relevance representing a relationship on a plurality of sets of first time-series data measured in a first time period with regard to a monitoring target is satisfied for a plurality of second time-series data measured in a second period of time;
calculating an irregularity degree representing a degree that the second time-series data is abnormal based on the relevance determined to be satisfied and the relevance determined not to be satisfied;
calculating a first degree representing a degree that the irregularity degree is a particular value when the second time-series data is normal or abnormal based on the irregularity degree calculated with regard to the second time-series data;
calculating a second degree representing a degree that the plurality of sets of second time-series data are related, based on the relevance with regard to the first period of time in accordance with the Ising model based on the relevance; and
deriving whether the second time-series data is normal or abnormal based on the first degree and the second degree and outputting an indication as to whether the second time-series data is normal or abnormal to thereby identify whether or not the second time-series data is a factor of a failure of the monitoring target.

15. A non-transitory computer-readable medium recorded with an abnormality detection program for causing a computer to realize:
a determination function configured to determine whether a relevance representing a relationship on a plurality of sets of first time-series data measured in a first time period with regard to a monitoring target is satisfied for a plurality of second time-series data measured in a second period of time;
an irregularity degree calculation function configured to calculate an irregularity degree representing a degree that the second time-series data is abnormal based on the relevance determined to be satisfied by the determination function and the relevance determined not to be satisfied by the determination function;
a first degree calculation function configured to calculate a first degree representing a degree that the irregularity degree is a particular value when the second time-series data is normal or abnormal based on the irregularity degree calculated with regard to the second time-series data;
a second degree calculation function configured to calculate a second degree representing a degree that the plurality of sets of second time-series data are related, on basis of the relevance with regard to the first period of time in accordance with the Ising model based on the relevance; and
a state calculation function configured to derive whether the second time-series data is normal or abnormal based on the first degree and the second degree and to output an indication as to whether the second time-series data is normal or abnormal to thereby identify whether or not the second time-series data is a factor of a failure of the monitoring target.

* * * * *